3,012,067
DIALKYLAMINOINDANYL METHYL-CARBAMATE

Warren W. Kaeding, Concord, Calif., assignor to The Dow Chemical Company, Midland, Mich., a corporation of Delaware
No Drawing. Filed Dec. 21, 1959, Ser. No. 860,689
4 Claims. (Cl. 260—479)

This invention is concerned with dialkylaminoindanyl methylcarbamates having the structure

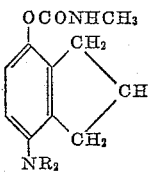

In this and succeeding formulas, R represents a lower alkyl radical containing from 1 to 4 carbon atoms, inclusive. The products of the present invention are white solids soluble inorganic solvents such as alcohols, acetone, chloroform and dimethylformamide and substantially insoluble in water. The compounds of the present invention are useful for the control of plant and water-infesting pests.

The dialkylaminoindanyl methylcarbamates may be prepared by reacting a dialkylaminoindanol having the structure

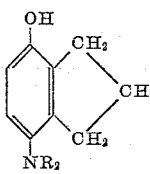

with methyl isocyanate in the presence of a tertiary amine catalyst. In carrying out the reaction, the appropriate dialkylaminoindanol is reacted with a substantially equimolar proportion of methyl isocyanate in an inert solvent and in the presence of a catalytic amount of tertiary amine. Suitable solvents for carrying out the reaction include dimethylformamide, methylene chloride, hexane and triethylamine. Suitable catalysts for carrying out the reaction include triethylamine, trimethylamine and pyridine. The reaction may be carried out in the temperature range of from about 25° to 39° C. at atmospheric pressure. The reaction is usually complete in a period of from about 50 minutes to 24 hours although the mixture may be allowed to stand for several days without detriment. Alternatively, the reaction may be carried out in the temperature range of from about 50° to 75° C. at pressures above atmospheric, such as that present in a closed vessel. Under these conditions, the reaction is usually complete in a period of from about 15 minutes to about 1½ hours. After completion of the reaction, the solvent is removed by vaporization to recover the desired dimethylaminoindanyl methylcarbamate product as residue. The latter may be purified, if desired, by conventional procedures.

In a preferred method for carrying out the reaction, about 10 percent molar excess of methyl isocyanate and a few drops of triethylamine catalyst are added at room temperature with stirring to a solution of 4-dimethylaminoindanol in an inert solvent. The reaction mixture is allowed to stand at room temperature overnight and the solvent removed by vaporization to recover the desired product. The latter may be purified by recrystallization.

The following examples illustrate the present invention but are not to be construed as limiting.

EXAMPLE 1

*7-dimethylamino-4-indanyl methylcarbamate*

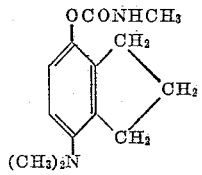

2 milliliters (0.035 mole) of methyl isocyanate and a few drops of triethylamine catalyst were added at room temperature with stirring to a solution of 4.5 grams (0.025 mole) of 7-dimethylaminoindanol in 40–50 milliliters of methylene chloride. The reaction mixture was allowed to stand for 2 days at room temperature and the solvent evaporated therefrom to obtain a 7-dimethylamino-4-indanyl methylcarbamate product as a white solid residue. The latter was recrystallized from hexane to obtain a purified product melting at 134°–135° C. The product had elemental analyses in percent as follows:

|  | Carbon | Hydrogen | Nitrogen |
|---|---|---|---|
| Theory | 66.64 | 7.74 | 11.96 |
| Found | 66.59 | 7.73 | 11.82 |

EXAMPLE 2

*7-di-normal-butylamino-4-indanyl methylcarbamate*

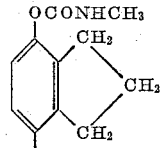

In a similar manner, 3.5 milliliters (0.061 mole) of methyl isocyanate and a few drops of triethylamine catalyst were added at room temperature with stirring to a solution of 10.9 grams (0.042 mole) of 7-di-normal-butylamino-4-indanol in about 50 milliliters of methylene chloride. The reaction mixture was allowed to stand at room temperature overnight and thereafter the solvent removed by vaporization to obtain a 7-di-normal-butylamino-4-indanyl methylcarbamate product as a white solid residue. The latter was recrystallized from hexane to obtain a purified product melting at 79°–81° C. The product had elemental analyses in percent as follows:

|  | Carbon | Hydrogen | Nitrogen |
|---|---|---|---|
| Theory | 71.66 | 9.50 | 8.80 |
| Found | 71.59 | 9.45 | 8.78 |

EXAMPLE 3

*7-diisobutylamino-4-indanyl methylcarbamate*

In a manner similar to that previously described, 4.5 milliliters (0.079 mole) of methyl isocyanate and a few drops of triethylamine catalyst were added to a solution of 15 grams (0.057 mole) of 7-diisobutylamino-4-indanol in 100 milliliters of pentane. The reaction mixture was allowed to stand overnight, thereafter decolorized with activated charcoal and the solvent then evaporated from the decolorized solution to obtain the desired 7-diisobutylamino-4-indanyl methylcarbamate product as an amber colored oil. The oil was allowed to stand for about 2 weeks at room temperature whereupon it crystallized into a waxy tan colored solid which melted in the temperature range of from 68° to 75° C.

EXAMPLE 4

In a manner similar to the foregoing, the following compounds are prepared:

7-diethylamino-4-indanyl methylcarbamate by the reaction of 7-diethylamino-4-indanol and methyl isocyanate in the presence of triethylamine catalyst.

7-diisopropylamino-4-indanyl methylcarbamate by the reaction of 7-diisopropylamino-4-indanol and methyl isocyanate in the presence of triethylamine catalyst.

7-di-normal-propylamino-4-indanyl methylcarbamate by the reaction of 7-di-normal-propylamino-4-indanol and methyl isocyanate in the presence of triethylamine catalyst.

The products of the present invention are useful for the control of various plant and water-infesting pests. Representative of the plant-infesting pests which are controlled by the compounds of the present invention are southern army worms, Mexican bean beetles and aphids. In a representative operation for the control of southern army worms, 7-dimethylamino-4-indanyl methylcarbamate was dispersed in water to prepare an aqueous spray composition containing 100 parts per million by weight of the dialkylaminoindanyl methylcarbamate per million parts by weight of ultimate spray mixture. This composition was applied to cranberry bean plants in amounts sufficient to wet the foliage. The leaf surfaces were then allowed to dry and the plants infested with a known number of southern army worm larvae. About 3 days after infestation, the plants were examined to ascertain the control of southern army worms attributable to the dialkylaminoindanyl methylcarbamate compound. It was found that complete kills of southern army worm larvae were obtained.

The compounds of the present invention are also useful for the control of water pests such as entomostracans, as well as undesirable water plants of various species.

In a representative operation for the control of entomostracans, complete control of Daphnia spp. were obtained when this aquatic pest in aqueous media was exposed to 7-dimethylamino-4-indanyl methylcarbamate at a concentration of 1 part by weight per million parts by weight of medium for 24 hours.

The reactant, 7-dialkylamino-4-indanol used in the preparation of the dialkylaminoindanyl methylcarbamates of the present invention may be prepared by reductive alkylation of 7-amino-4-indanol. In carrying out this preparation, the 7-amino-4-indanol is reacted with at least 2 molar proportions of an aliphatic aldehyde containing from 1 to 4 carbon atoms, inclusive, and hydogen in the presence of palladium on charcoal catalyst at a temperature of from 10° to 75° C. and a pressure of from 10 to 50 pounds per square inch to produce the desired 7-dialkylamino-4-indanol.

I claim:

1. A compound having the structure

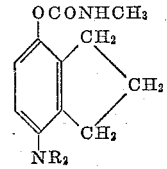

wherein R is a lower alkyl group containing from 1 to 4 carbon atoms, inclusive.

2. 4-(7-dimethylamino)-indanyl methylcarbamate.

3. 4-(7-di-normal-butylamino)-indanyl methylcarbamate.

4. 4-(7-diisobutylamino)-indanyl methylcarbamate.

References Cited in the file of this patent

UNITED STATES PATENTS 2,870,057    Hartle    Jan. 20, 1959

OTHER REFERENCES

Kolbezen et al.: Journal of Agricultural and Food Chemistry, vol. 2, pages 864–70 (1954).